July 7, 1953  E. A. PIERRE  2,644,857
RECORDING AND REPRODUCING SOUND
Filed Nov. 30, 1949
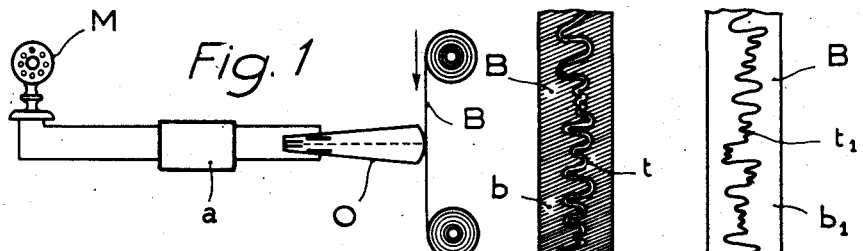
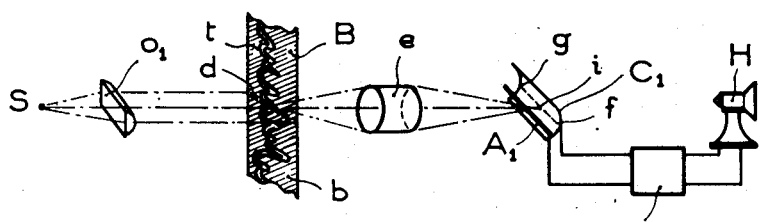
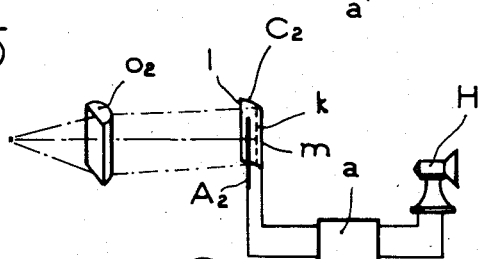
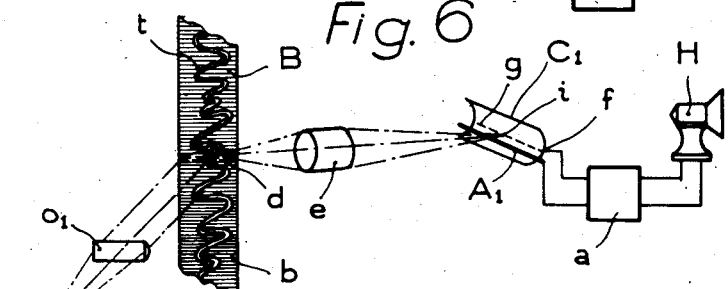
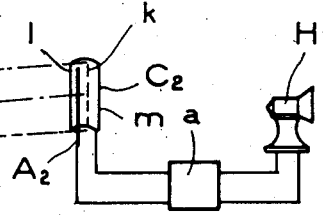

Patented July 7, 1953

2,644,857

UNITED STATES PATENT OFFICE 2,644,857

RECORDING AND REPRODUCING SOUND

Emile Alfred Pierre, Paris, France, assignor to l'Electronique Moderne S. A. R. L., Valenciennes, France, a corporation of the French Republic Application November 30, 1949, Serial No. 130,110
In France December 7, 1948

7 Claims. (Cl. 179—100.3)

My invention relates to a method of recording and reproducing the sound.

As it is already known, there are at present two methods of recording the sound-variations which are particularly used for adding the sound effects to a film. One of them uses a graph having a variable luminous density on the whole width of the film, the other a graph having a variable width made of two respectively clear and dull areas, divided by an undulating line which represents the recording of the modulation of the microphone current.

These two methods, which require rather complicated apparatuses, enable to reproduce the sound modulation by using variations of luminous intensity when projected on the cathode of a photo-electric cell for modulating the anode current.

The recording method according to the invention is based on the fact that the current passing through the anode of a photo-electric cell whose cathode receives a spot of light varies as a function of the point of impact of this spot of light on the cathode. Consequently this method uses the variation of the position of a spot of light, while the previous methods are based on the variation of the intensity of light of the flux focused on the cathode.

A first object of my invention is to provide a method of recording, by means of a cathode-ray oscillograph, the electric modulation corresponding to the sound-vibrations, under the shape of a graph having a slight thickness, uniformly clear or dull, contrasting with the back-ground surface, also uniformly clear or dull.

A further object of my invention is to record on a suitable carrier substance under the shape of a graph contrasting with the back-ground surface, for instance clear on a dull back-ground surface or dull on a clear back-ground surface.

This carrier substance may be for instance either paper or a transparent film. The recording is similar either to a positive or negative picture of a conventional photographic recording.

A further object of my invention is to provide a method of reproducing the recording thus obtained which consists in focusing on said graph a scanning beam light, producing, on the cathode of a photo-electric cell, a pin point or lineal spot of light and, after a suitable amplification, in using in a sound reproducing device, such as a loud-speaker, the corresponding electric modulation for reproducing, in a known manner, the initial sound-vibrations.

It is easy to understand that, when the carrier substance is respectively transparent or opaque the graph is transmitted through transparence or reflection.

The simple recording of the variations of position of the cathode beam provides, comparatively with the previous recording methods, a very important simplification.

Other objects and advantages of the invention will be apparent during the course of the following description.

In the accompanying drawings, forming a part of this application, and in which like numerals are employed to designate like parts throughout the same, Fig. 1 shows diagrammatically the recording method according to the invention, Figs. 2 and 3 show the recording under the shape of a graph having a slight thickness, uniformly clear or dull, respectively clear on a dull back-ground and dull on a clear back ground, Fig. 4 is a diagrammatic view showing the use of a recording by means of a transparent film, and projecting a pin-point spot of light on the cathode, Fig. 5 is a partial view showing the use of the method in the case of a similar recording but projecting a lineal spot of light on the cathode, Fig. 6 is a diagrammatic view of the use of the method in the case of an opaque recording, by reflection of a scanning beam producing a pin point spot of light on the cathode, and, Fig. 7 shows the same use of the method in the case of a lineal spot.

Fig. 1 shows diagrammatically the recording of sound vibrations by means of a microphone M generating a modulated current, which is amplified at $a$, and actuates a cathode-ray oscillograph O. The cathode-rays are recorded on a transparent or opaque strip or film B which runs between two parallel reels. The obtained recording is a uniformly thick graph, either clear $t$ on a uniformly dull back-ground surface $b$ (Fig. 2), or dull $t_1$ on a clear back-ground $b_1$ (Fig. 3).

In Fig. 4 the reproduction is obtained using a transparent film B, with the help of a source of light S and an optical device $o_1$, which is a portion of a cylinder, generating a rectilineal image when the source is a point. This rectilineal image $d$ is located transversely with respect to the direction of the running film. Its intersection with the transparent graph $t$ generates a light spot having a transversely variable position and acting as a source of light. A centred optical system $e$ gives a pin-point image $i$ of this light spot on the cathode $c_1$ of a photo-electric cell. This image $i$, which is the point of impact of the scanning beam of light on the cathode, travels between the points $f$ and $g$, and generates in the anode $A_1$ a current of variable intensity which, after having been amplified at $a$, reaches a sound reproducing device such as a loud speaker H.

The embodiment shown in Fig. 5 relates to the generation on a cathode $C_2$, of a lineal spot $k$. The latter is obtained in using the light spot, resulting of the intersection of the rectilineal image $d$ and graph $t$, in an optical device $o_2$ analogous to $o_1$. The lineal spot $k$ travels between the positions $l$ and $m$, and generates in the anode $A_2$ a current having a variable intensity.

Fig. 6 shows diagrammatically the reproduction of a sound recording, using the reflection of a scanning beam of light on a clear graph $t$ recorded on an opaque strip B, generating on the cathode a light spot $i$.

The source of light S generates on the opaque strip B, through an optical device $O_1$ such as above described, a transverse strip of light $d$ whose intersection with graph $t$ gives a more luminous spot, acting as a source of light whose position is transversely variable. A centered optical system $e$ gives on the cathode $c_1$ a spot of light $i$ which travels between the points $f$ and $g$. The current of variable intensity generated in the anode $A_1$ reaches the sound reproducing device H after having been amplified at $a$.

In Fig. 7, the light spot produced by the intersection of strip $d$ and graph $t$ is used in an optical device $o_2$, giving on the cathode $C_2$ a lineal spot $k$ which travels between $l$ and $m$.

What I claim is:

1. An arrangement for reproducing sound vibrations, comprising, in combination, a carrier strip of substantially uniform light permeability, said carrier strip having a sound record formed by a sound-recording line of substantially uniform width, said sound-recording line having a light permeability being different from the light permeability of said carrier strip; lens means focusing a light beam in a linear pencil across said carrier strip so that said pencil is transformed by said sound-recording line on said carrier strip into a point-shaped light spot the position of which depends on the shape of said sound-recording line, said point-shaped light spot omitting a light beam the position of which varies according to the variation of the position of said light spot; and a photoelectric cell having a cathode arranged in the path of said light beam so that the same forms on said cathode a light spot the position of which on said cathode varies depending upon the position of said light beam, said photoelectric cell being constructed so that its output varies in dependency upon the position on said cathode of said light spot formed thereon.

2. An arrangement for reproducing sound vibrations, comprising, in combination, a carrier strip of substantially uniform light permeability, said carrier strip having a sound record formed by a sound-recording line of substantially uniform width, said sound-recording line having a light permeability being different from the light permeability of said carrier strip; first lens means focusing a light beam in a linear pencil across said carrier strip so that said pencil is transformed by said sound-recording line on said carrier strip into a point-shaped light spot the position of which depends on the shape of said sound-recording line, said point-shaped light spot emitting a light beam the position of which varies according to the variation of the position of said light spot; a photoelectric cell having a cathode arranged in the path of said light beam so that the same forms on said cathode a light spot the position of which on said cathode varies depending upon the position of said light beam, said photoelectric cell being constructed so that its output varies in dependency upon the position on said cathode of said light spot formed thereon; and second lens means arranged in the path of said light beam so as to concentrate the same and reduce the size of the light spot formed on said cathode.

3. An arrangement for producing sound vibrations, comprising, in combination, means emitting a pencil-shaped light beam; means influenced by the sound vibration to be reproduced for oscillating said pencil-shaped light beam in a plane in accordance with the oscillation of said sound vibration to be reproduced; and a photoelectric cell having a cathode arranged in the path of said oscillating light beam so that the same forms on said cathode a light spot the position of which on said cathode varies in dependency upon the position of said oscillating light beam, said photoelectric cell being constructed so that its output depends upon the position on said cathode of said light spot formed thereon by said oscillating pencil-shaped light beam.

4. An arrangement for reproducing sound vibrations, comprising, in combination, an opaque carrier strip of substantially uniform light permeability, said carrier strip having a sound record formed by a transparent sound-recording line of substantially uniform width, said sound-recording line having a light permeability being different from the light permeability of said carrier strip; lens means focusing a light beam in a linear pencil across said carrier strip so that said pencil is transformed by said sound-recording line on said carrier strip into a point-shaped light spot the position of which depends on the shape of said sound-recording line, said point-shaped light spot emitting a light beam the position of which varies according to the variation of the position of said light spot; and a photoelectric cell having a cathode arranged in the path of said light beam so that the same forms on said cathode a light spot the position of which on said cathode varies depending upon the position of said light beam, said photoelectric cell being constructed so that its output varies in dependency upon the position on said cathode of said light spot formed thereon.

5. An arrangement for reproducing sound vibrations, comprising, in combination, a transparent carrier strip of substantially uniform light permeability, said carrier strip having a sound record formed by an opaque sound-recording line of substantially uniform width, said sound-recording line having a light permeability being different from the light permeability of said carrier strip; lens means focusing a light beam in a linear pencil across said carrier strip so that said pencil is transformed by said sound-recording line on said carrier strip into a point-shaped light spot the position of which depends on the shape of said sound-recording line, said point-shaped light spot emitting a light beam the position of which varies according to the variation of the position of said light spot; and a photoelectric cell having a cathode arranged in the path of said light beam so that the same forms on said cathode a light spot the position of which on said cathode varies depending upon the position of said light beam, said photoelectric cell being constructed so that its output varies in dependency upon the position on said cathode of said light spot formed thereon.

6. An arrangement for reproducing sound vibrations, comprising, in combination, an opaque carrier strip of substantially uniform light permeability, said carrier strip having a sound record formed by a transparent sound-recording line of substantially uniform width, said sound-recording line having a light permeability being different from the light permeability of said carrier strip; first lens means focusing a light beam in a linear pencil across said carrier strip so that said pencil is transformed by said sound-recording line on said carrier strip into a point-shaped light spot the position of which depends on the shape of said sound-recording line, said point-shaped light spot emitting a light beam the position of which varies according to the variation of the position of said light spot; a photoelectric cell having a cathode arranged in the path of said light beam so that the same forms on said cathode a light spot the position of which on said cathode varies depending upon the position of said light beam, said photoelectric cell being constructed so that its output varies in dependency upon the position on said cathode of said light spot formed thereon; and second lens means arranged in the path of said light beam so as to concentrate the same and reduce the size of the light spot formed on said cathode.

7. An arrangement for reproducing sound vibrations, comprising, in combination, a transparent carrier strip of substantially uniform light permeability, said carrier strip having a sound record formed by an opaque sound-recording line of substantially uniform width, said sound-recording line having a light permeability being different from the light permeability of said carrier strip; first lens means focusing a light beam in a linear pencil across said carrier strip so that said pencil is transformed by said sound-recording line on said carrier strip into a point-shaped light spot the position of which depends on the shape of said sound-recording line, said point-shaped light spot emitting a light beam the position of which varies according to the variation of the position of said light spot; a photoelectric cell having a cathode arranged in the path of said light beam so that the same forms on said cathode a light spot the position of which on said cathode varies depending upon the position of said light beam, said photoelectric cell being constructed so that its output varies in dependency upon the position on said cathode of said light spot formed thereon; and second lens means arranged in the path of said light beam so as to concentrate the same and reduce the size of the light spot formed on said cathode.

EMILE ALFRED PIERRE.

References Cited in the file of this patent

UNITED STATES PATENTS

| Number | Name | Date |
| --- | --- | --- |
| 1,203,190 | Fritts | Oct. 31, 1916 |
| 1,657,292 | Williamson | Jan. 24, 1928 |
| 1,864,363 | McCreary | June 21, 1932 |
| 2,299,738 | Collins | Oct. 27, 1942 |